United States Patent
Soo et al.

(10) Patent No.: US 7,529,231 B2
(45) Date of Patent: May 5, 2009

(54) ROUTING METHODS AND SYSTEMS USING ENUM SERVERS INTERNAL AND EXTERNAL TO A SERVICE PROVIDER NETWORK

(75) Inventors: Armstrong Soo, San Francisco, CA (US); Blair Lane Porter, Ballwin, MO (US); Bernard Siu-Man Ku, Austin, TX (US); Phyllis G. Anderson, Austin, TX (US)

(73) Assignee: AT&T Intellectual Property L.L.P., Reno, NV (US)

( * ) Notice: Subject to any disclaimer, the term of this patent is extended or adjusted under 35 U.S.C. 154(b) by 287 days.

(21) Appl. No.: 11/331,955

(22) Filed: Jan. 13, 2006

(65) Prior Publication Data

US 2007/0165613 A1   Jul. 19, 2007

(51) Int. Cl.
*H04L 12/66* (2006.01)
*G06F 15/16* (2006.01)
(52) U.S. Cl. .................. 370/352; 370/356; 709/203
(58) Field of Classification Search ......... 370/351–356, 370/401, 395.31; 379/272–277; 709/203
See application file for complete search history.

(56) References Cited

U.S. PATENT DOCUMENTS

| 6,917,612 | B2* | 7/2005 | Foti et al. ............... 370/352 |
| 2002/0136206 | A1 | 9/2002 | Gallant et al. |
| 2003/0007482 | A1 | 1/2003 | Khello et al. |
| 2003/0032432 | A1 | 2/2003 | Red et al. |
| 2003/0055990 | A1 | 3/2003 | Cheline et al. |
| 2003/0074461 | A1 | 4/2003 | Kang et al. |
| 2003/0081752 | A1 | 5/2003 | Trandal et al. |
| 2003/0128693 | A1 | 7/2003 | Segal |
| 2004/0057419 | A1 | 3/2004 | Stanford |
| 2004/0156394 | A1 | 8/2004 | Westman |
| 2004/0196858 | A1 | 10/2004 | Tsai et al. |
| 2004/0258063 | A1 | 12/2004 | Raith et al. |
| 2005/0027867 | A1 | 2/2005 | Mueller et al. |
| 2005/0114367 | A1 | 5/2005 | Serebrennikov |
| 2005/0201364 | A1* | 9/2005 | Dalton et al. ............... 370/352 |
| 2005/0220082 | A1 | 10/2005 | Toyoda |
| 2005/0286531 | A1* | 12/2005 | Tuohino et al. .......... 370/395.2 |

(Continued)

OTHER PUBLICATIONS

International Preliminary Report on Patentability for International Application No.: PCT/US2006/042726, mailed Jul. 24, 2008.

*Primary Examiner*—Ahmad F Matar
*Assistant Examiner*—Sonia Gay
(74) *Attorney, Agent, or Firm*—Toler Law Group

(57) ABSTRACT

A Voice over Internet Protocol (VoIP) call from a first provider to a destination telephone number served by a second provider comprises sending a Session Initiation Protocol (SIP) INVITE message from an originating switch to a first SIP server of the first provider. The first SIP server queries a telephone number mapping (ENUM) server of either the first, second or a third provider, and receives a Uniform Resource Identifier (URI) associated with the destination telephone number. The ENUM server may be internal or external to the first provider. The first provider queries a Domain Name Service (DNS) server based on the URI, and receives an Internet Protocol (IP) address of a second SIP server of the second provider. The first SIP server and the second SIP server are used to set up a bearer path for the VoIP call between the originating switch and a destination switch.

22 Claims, 8 Drawing Sheets

U.S. PATENT DOCUMENTS

2006/0165068 A1* 7/2006 Dalton et al. ............... 370/352
2007/0061397 A1* 3/2007 Gregorat et al. ............. 709/203
2007/0104184 A1* 5/2007 Ku et al. .................... 370/352

* cited by examiner

US 7,529,231 B2

ROUTING METHODS AND SYSTEMS USING ENUM SERVERS INTERNAL AND EXTERNAL TO A SERVICE PROVIDER NETWORK

FIELD OF THE DISCLOSURE

The present disclosure is generally related to routing methods using telephone number mapping (ENUM) databases.

BACKGROUND

Carriers and service providers query an ENUM infrastructure to translate telephone numbers, such as E.164 numbers, into Uniform Resource Identifiers (URIs). Each URI is used to complete a respective Voice over Internet Protocol (VoIP) call to its associated telephone number.

The Public ENUM infrastructure comprises of Tier-0, Tier-1 and Tier-2 databases. The Tier-0 database is indexed by country codes and points queries to an appropriate Tier-1 database. The Tier-0 database is operated by RIPE in Europe. The Tier-1 databases are to point queries to an appropriate Tier-2 database. The Tier-1 databases are to be operated by individual countries. In Country Code 1, the function of Tier-1 is subdivided into Tier-1a and Tier-1b. Tier-1a, which is indexed by NPA, points queries to an appropriate Tier-1b, which is indexed by full E.164. Each country may operate its own Tier-1b. Tier-1b points queries to the Tier-2 having actual records of services associated with each of a plurality of telephone numbers.

DETAILED DESCRIPTION OF THE DRAWINGS

Figure 1:
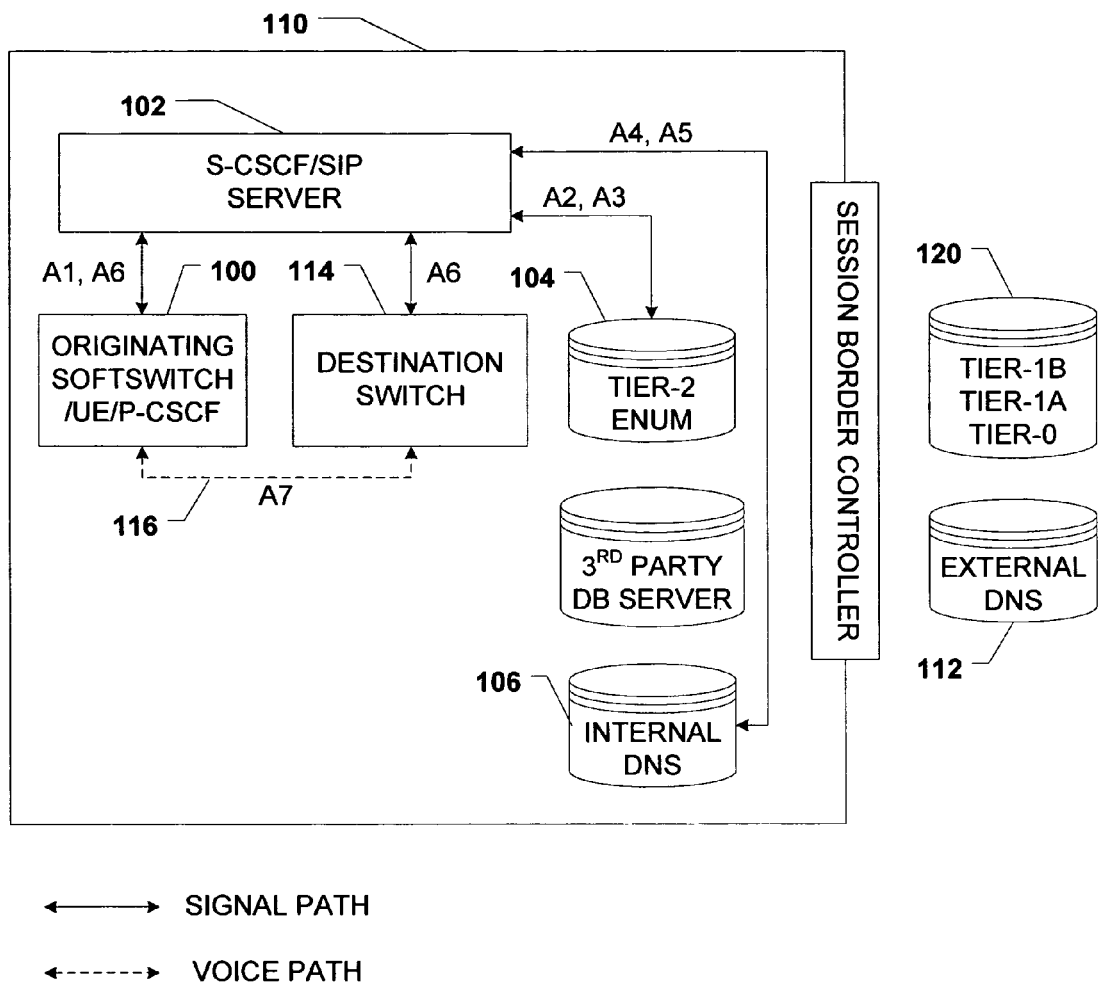
FIG. 1 is a block diagram of a first embodiment of a method and system to process a VoIP call to a destination telephone number.

Disclosed herein are embodiments of architectures that enable a carrier or service provider to implement end-user and/or carrier/infrastructure ENUM to complete ENUM query call flows. The herein-disclosed embodiments eliminate a traditional need for a carrier or service provider to query outside an ENUM discovery hierarchy/infrastructure to identify ownership of a telephone number such as an E.164 number. Thus, the herein-disclosed embodiments do not require an external third-party clearing house, such as a Tier-1a or a Tier-1b database, to enable carriers and providers to peer and exchange routes. Further, the herein-disclosed embodiments allow each carrier or service provider to accommodate any special routing requirements or to otherwise provide routing paths that can be unique for each peering agreement.

Some embodiments of methods and systems for ENUM query flow address how to handle intra-carrier or intra-service-provider VoIP calls (e.g. when a VoIP service provider processes a VoIP call to a destination telephone number whose VoIP service is provided by the same VoIP service provider). In an embodiment, the VoIP service provider queries an internal ENUM server that is internal to the VoIP service provider, rather than an external ENUM server that is external to the VoIP service provider, based on the destination telephone number. The query returns a URI associated with the destination telephone number. The VoIP call is routed to the destination telephone number based on the URI. By querying its own ENUM server, rather than an external ENUM server, for its own E.164 telephone numbers, the VoIP service provider can reduce the call processing time to complete an IP-to-IP voice or multimedia connection.

Some embodiments of methods and systems for ENUM query flow address how to handle inter-carrier or inter-service-provider VoIP calls (e.g. when a first VoIP service provider processes a VoIP call to a destination telephone number whose VoIP service is provided by a second VoIP service provider). In an embodiment, the first VoIP service provider queries an ENUM server that is internal to the second VoIP service provider. The query returns a URI associated with the destination telephone number. The VoIP call is routed from the first VoIP service provider to the destination telephone number based on the URI. In another embodiment, the first VoIP service provider queries an ENUM server that is internal to a third VoIP service provider other than the first and second VoIP service providers. The query returns a URI associated with the destination telephone number. The VoIP call is routed to the destination telephone number based on the URI.

The herein-disclosed ENUM servers map a telephone number, such as an E.164 number, to a computer address such as a URI. In contrast, the herein-disclosed internal and external DNS servers map domain names to Internet Protocol (IP) addresses.

The herein-disclosed drawings aim to depict functional entities, and do not necessarily represent actual quantities of the entities. Further, some aspects of the embodiments may change as various ENUM requirements are proposed, finalized and ratified.

FIG. 1 is a block diagram of a first embodiment of a method and system to process a VoIP call to a destination telephone number. The destination telephone number may comprise an E.164 number.

An originating softswitch 100 sends a Session Initiation Protocol (SIP) INVITE message to a SIP server 102 (act A1). The SIP server 102 is responsible for finding an IP address of a destination softswitch associated with the destination telephone number.

The SIP server 102 queries a Tier-2 ENUM server 104 to attempt to resolve the destination telephone number (act A2). In this embodiment, the Tier-2 ENUM server 104 is authoritative. In response to the query, the Tier-2 ENUM server 104 returns a Uniform Resource Indicator (URI) associated with the destination telephone number. The SIP server 102 receives the URI associated with the destination telephone number (act A3).

The Tier-2 ENUM server 104 queries an internal DNS server 106 (act A4) to resolve a domain name of the URI of the destination telephone number. The internal DNS server 106 is internal to a network 110 of a service provider. Thus, an external DNS server 112 is not queried. In response to the query, the internal DNS server 106 returns an IP address of a destination SIP server, which is received by the Tier-2 ENUM server 104 (act A5). In this embodiment, the domain of the URI is the same domain of the SIP server 102. This scenario occurs when the caller and callee are both served by the same service provider.

The SIP server 102 uses the IP address to attempt to set up a bearer path to a destination softswitch 114 for the VoIP call (act A6). If successful, a voice path 116 is established between the originating softswitch 100 and the destination softswitch 114 based on the URI (act A7). Thus, the voice path 116 is established without accessing a Tier-1a, Tier-1b, or Tier-0 ENUM hierarchy 120.

Figure 2:
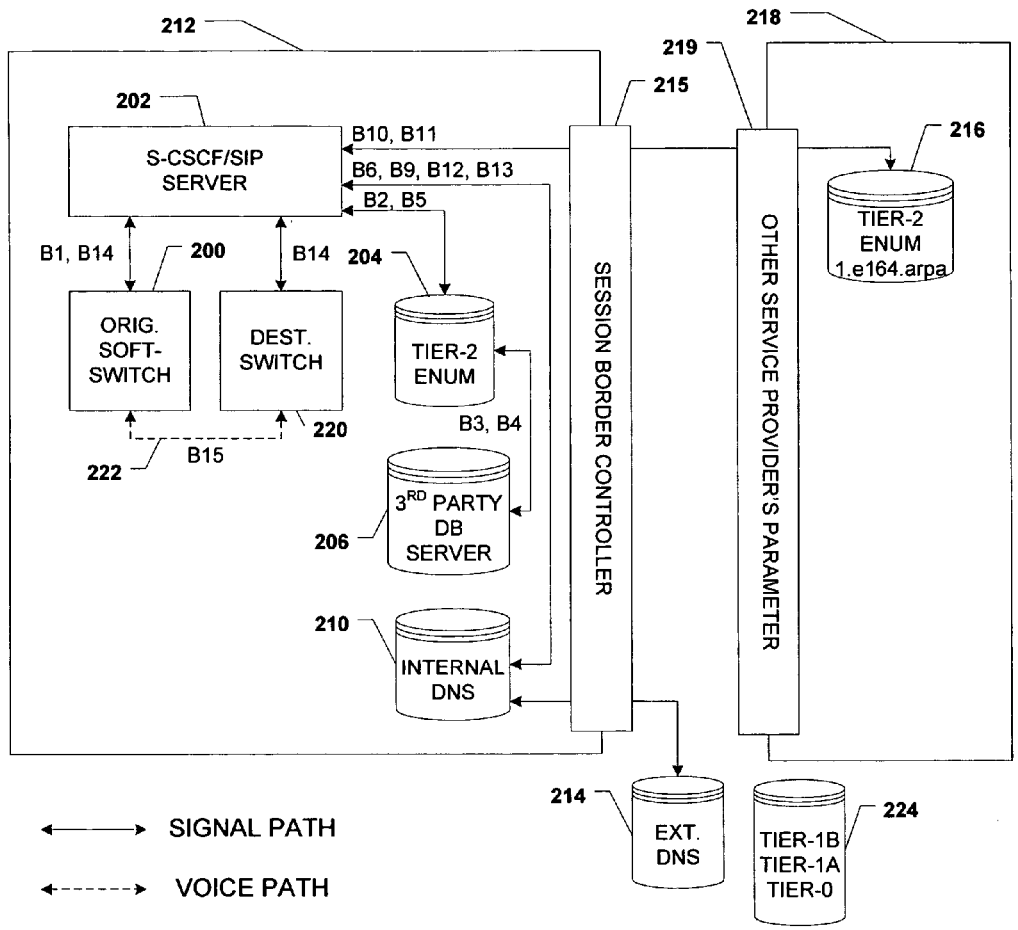
FIG. 2 is a block diagram of a second embodiment of a method and system to process a VoIP call to a destination telephone number.

FIG. 2 is a block diagram of a second embodiment of a method and system to process a VoIP call to a destination telephone number. The destination telephone number may comprise an E.164 number.

An originating softswitch 200 sends a SIP INVITE message to a SIP server 202 (act B1). The SIP server 202 is responsible for finding an IP address of a destination softswitch associated with the destination telephone number.

The SIP server 202 queries a Tier-2 ENUM server 204 to attempt to resolve the destination telephone number (act B2). If the Tier-2 ENUM server 204 does not have a match for the destination telephone number, the Tier-2 ENUM server 204 queries a third-party database server 206 based on the destination telephone number (act B3). In response to the query, the third-party database server 206 returns a carrier identifier of the owner of the destination telephone number, which is received by the Tier-2 ENUM server 204 (act B4).

The Tier-2 ENUM server 204 performs an internal lookup for an appropriate domain that matches the carrier identifier. If no match is found, the Tier-2 ENUM server 204 returns a no-record-found message to the SIP server 202. In this case, the SIP server 202 defaults to a Public Switched Telephone Network (PSTN)/Public Line Mobile Network (PLMN) gateway, or another default route to route the call. If a match is found, the domain is returned to the SIP server 202 (act B5). In this case, the SIP server 202 queries an internal DNS server 210 to attempt to resolve the domain name returned from the Tier-2 ENUM server 204 (act B6). The internal DNS server 210 is internal to a network 212 of a service provider for the caller. The internal DNS server 210 performs a recursive query to an external DNS server 214 (act B7) to attempt to resolve the domain name. The internal DNS server 210 communicates with the external DNS server 214 via a Session Border Controller 215. The external DNS server 214 returns an IP address of a Tier-2 ENUM server 216, which is received by the internal DNS server 210 (act B8).

In this embodiment, the authoritative server is the Tier-2 ENUM server 216 that is external to the network 212 of the service provider for the caller, and thus is not the Tier-2 ENUM server 204 internal to the network 212. The Tier-2 ENUM server 216 may be internal to a network 218 of a different service provider.

The internal DNS server 210 passes the IP address of the Tier-2 ENUM server 216 to the SIP server 202 (act B9). The SIP server 202 uses the IP address to query the Tier-2 ENUM server 216 to attempt to resolve the destination telephone number (act B10). The SIP server 202 communicates with the Tier-2 ENUM server 216 via a session border control gateway, such as the Session Border Controller 215 of the network 212, and an interface 219 of the network 218.

The Tier-2 ENUM server 216 returns a URI associated with the destination telephone number, which is received by the SIP server 202 (act B11). The SIP server 202 queries the internal DNS 210 to attempt to resolve a domain name of the URI (act B12). In response to the query, the internal DNS 210 returns an IP address of the domain name (act B13). In this embodiment, the domain of the URI is the same domain of the SIP server 202. This scenario occurs when the caller and callee are both served by the same service provider. The SIP server 202 uses the URI to attempt to set up a bearer path to a destination softswitch 220 for the VoIP call (act B14). If successful, a voice path 222 is established between the originating softswitch 200 and the destination softswitch 220 based on the URI (act B15). Thus, the voice path 222 is established without accessing a Tier-1a, Tier-1b, or Tier-0 ENUM hierarchy 224.

An example of the second embodiment is as follows. The SIP server 202 queries the Tier-2 ENUM server 204 for an E.164 number. Because the Tier-2 ENUM server 204 cannot locate the E.164 in its database, the Tier-2 ENUM server 204 queries the third-party database server 206 for the E.164 number. Based on the query, the third-party database server returns a carrier identifier of "007" for the E.164. The Tier-2 ENUM server 204 performs a lookup in an internal table to determine if a pre-defined route exists for the carrier identifier "007". The pre-defined route exists in the internal table because the service provider for the caller has a peering agreement with the carrier identifier "007". According to the agreement, the service provider is to query the Tier-2 ENUM server 216 that is an authoritative ENUM server that belongs to the carrier identifier "007". Based on the lookup, the Tier-2 ENUM server 204 returns an address of the Tier-2 ENUM server 216, e.g. "att.enum.carrier007.net", to the SIP server 202.

Consider another VoIP carrier that has established a peering agreement with the same carrier with carrier identifier "007" ("Carrier 007"). The peering agreement may request the VoIP carrier to query Carrier 007's Tier-2 ENUM server 216 at a different address or entry point, such as "others.enum.carrier007.net". Carrier 007 may provide a different URI for the same E.164 based on entry point to facilitate traffic management and/or to maintain different Service Level Agreements (SLAs).

Figure 3:
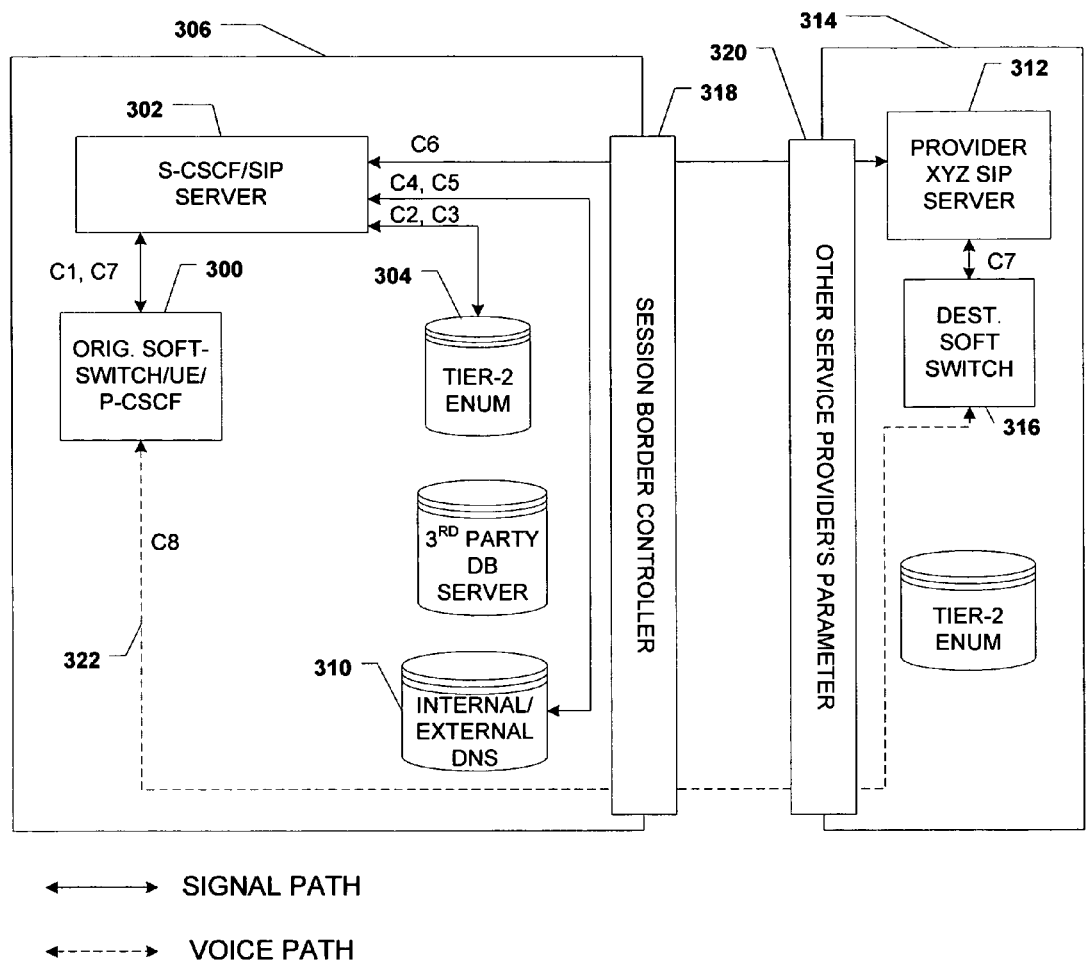
FIG. 3 is a block diagram of a third embodiment of a method and system to process a VoIP call to a destination telephone number.

FIG. 3 is a block diagram of a third embodiment of a method and system to process a VoIP call to a destination telephone number. The destination telephone number may comprise an E.164 number.

An originating softswitch 300 sends a SIP INVITE message to a SIP server 302 (act C1). The SIP server 302 is responsible for finding an IP address of a destination softswitch associated with the destination telephone number.

The SIP server 302 queries a Tier-2 ENUM server 304 to attempt to resolve the destination telephone number (act C2). The Tier-2 ENUM server 304 is internal to a network 306 of a service provider for the caller. The Tier-2 ENUM server 304 returns a URI associated with the destination telephone number, which is received by the SIP server 302 (act C3). In this case, the domain of the URI is the name of a destination carrier other than the service provider for the caller. The SIP server 302 queries internal/external DNS servers 310 to resolve the domain name of the URI (act C4). Although depicted as a single block, the internal/external DNS servers 310 comprise an internal DNS server and an external DNS server (e.g. the internal DNS server 210 and the external DNS server 214 in FIG. 2) that cooperate in a manner described with reference to FIG. 2. In response to the query, the internal/external DNS servers 310 return an IP address for the domain, which is received by the SIP server 302 (act C5). In this embodiment, the IP address is for a destination SIP server 312 for a network 314. This scenario may occur when the caller and the callee are served by different service providers.

The SIP server 302 negotiates with SIP server 312 of the different service provider (act C6) to attempt to set up a bearer path to a destination softswitch 316 for the VoIP call (act C7). To attempt to set up the bearer path, the SIP server 302 communicates with the SIP server 312 via a session border gateway controller, such as the Session Border Controller 318 of the network 306 and an interface 320 of the network 314. If successful, a voice path 322 is established between the originating softswitch 300 and the destination softswitch 316 based on the URI (act C8).

Figure 4:
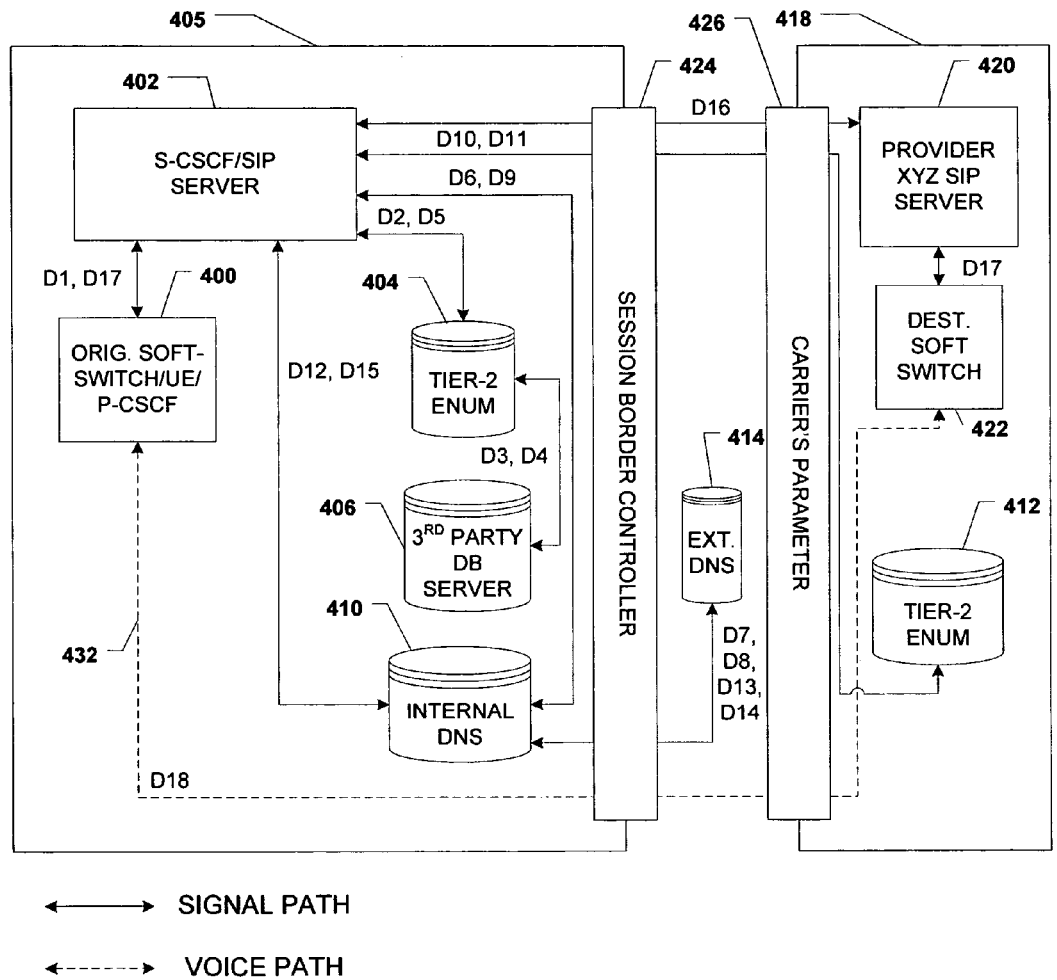
FIG. 4 is a block diagram of a fourth embodiment of a method and system to process a VoIP call to a destination telephone number.

FIG. 4 is a block diagram of a fourth embodiment of a method and system to process a VoIP call to a destination telephone number. The destination telephone number may comprise an E.164 number.

An originating softswitch 400 sends a SIP INVITE message to a SIP server 402 (act D1). The SIP server 402 is responsible for finding an IP address of a destination softswitch associated with the destination telephone number.

The SIP server 402 queries a Tier-2 ENUM server 404 to attempt to resolve the destination telephone number (act D2). The Tier-2 ENUM server 404 is internal to a network 405 of a service provider for the caller.

When the Tier-2 ENUM server 404 does not have a match for the destination telephone number, the following acts are performed. The Tier-2 ENUM server 404 queries a third-party database server 406 (act D3). If a match is found in response to the query, the third-party database server 406 returns a carrier identifier of the owner of the destination telephone number, which is received by the Tier-2 ENUM server 404 (act D4). If no match is found, the third-party database server 406 returns a no-record-found message to the Tier-2 ENUM server 404.

The Tier-2 ENUM server 404 performs an internal lookup for an appropriate domain that matches the carrier identifier. If a match is found, the domain name is returned to the SIP server 402 (act D5). If no match is found, a no-record-found message is returned to the SIP server 402.

The SIP server 402 queries an internal-facing DNS server 410 to attempt to resolve the domain name of a Tier-2 ENUM server 412. The internal-facing DNS server 410 is internal to the network 405. Generally, an internal-facing DNS server ("internal DNS") serves clients internal to a private network and contains internal mapping information such as addresses of internal websites and resources to the carrier or intranet. An external-facing DNS ("external DNS") server serves external commercial clients, such as Digital Subscriber Line (DSL) users and other commercial customers. As such, external DNS does not necessarily contain internal mapping information of the carrier itself. External DNS is usually connected to a public DNS hierarchy to cache and discover addresses of which it is not authoritative.

The internal DNS server 410 queries an external DNS server 414 (act D7) to attempt to resolve the domain name of the Tier-2 ENUM server 412. The external DNS server is external to the network 405. The external DNS server 414 returns an IP address of the Tier-2 ENUM server 412, which is received by the internal DNS server 410 (act D8).

In this embodiment, the authoritative server is the Tier-2 ENUM server 412 that is external to the network 405 of the service provider for the caller, and thus is not the Tier-2 ENUM server 404 internal to the network 205. The Tier-2 ENUM server 412 may be internal to a network 418 of a different service provider.

The internal DNS server 410 passes the IP address of the Tier-2 ENUM server 412 to the SIP server 402 (act D9). The SIP server 402 uses the IP address to query the Tier-2 ENUM server 412 to attempt to resolve the destination telephone number (act D10). The Tier-2 ENUM server 412 returns a URI associated with the destination telephone number, which is received by the SIP server 402 (act D11). Consider the URI being of a SIP server 420 in the network 418. This scenario occurs when the caller and callee are served by different service providers.

The SIP server 402 queries the internal DNS 410 to attempt to resolve a domain name of the URI of a SIP server 420 (act D12). In response to the query, the internal DNS server 410 determines if it has a match for the domain name. If the internal DNS server 410 does not have a match, the internal DNS server 410 queries the external DNS server 414 to attempt to resolve the domain name of the SIP server 420 (act D13). In response to the query, the external DNS server 414 returns an IP address of the domain name of the SIP server 420 to the internal DNS server 410 (act D14). The internal DNS server 410 passes the IP address back to the SIP server 402 (act D15).

The SIP server 402 uses the IP address to attempt to set up a bearer path to a destination softswitch 422 for the VoIP call (act D16). To attempt to set up the bearer path, the SIP server 402 negotiates with the SIP server 420 via a Session Border Controller 424 of the network 405 and an interface 426 of the network 418. If successful, a voice path 432 is established between the originating softswitch 400 and the destination softswitch 412 based on the URI (act D17).

Figure 5:
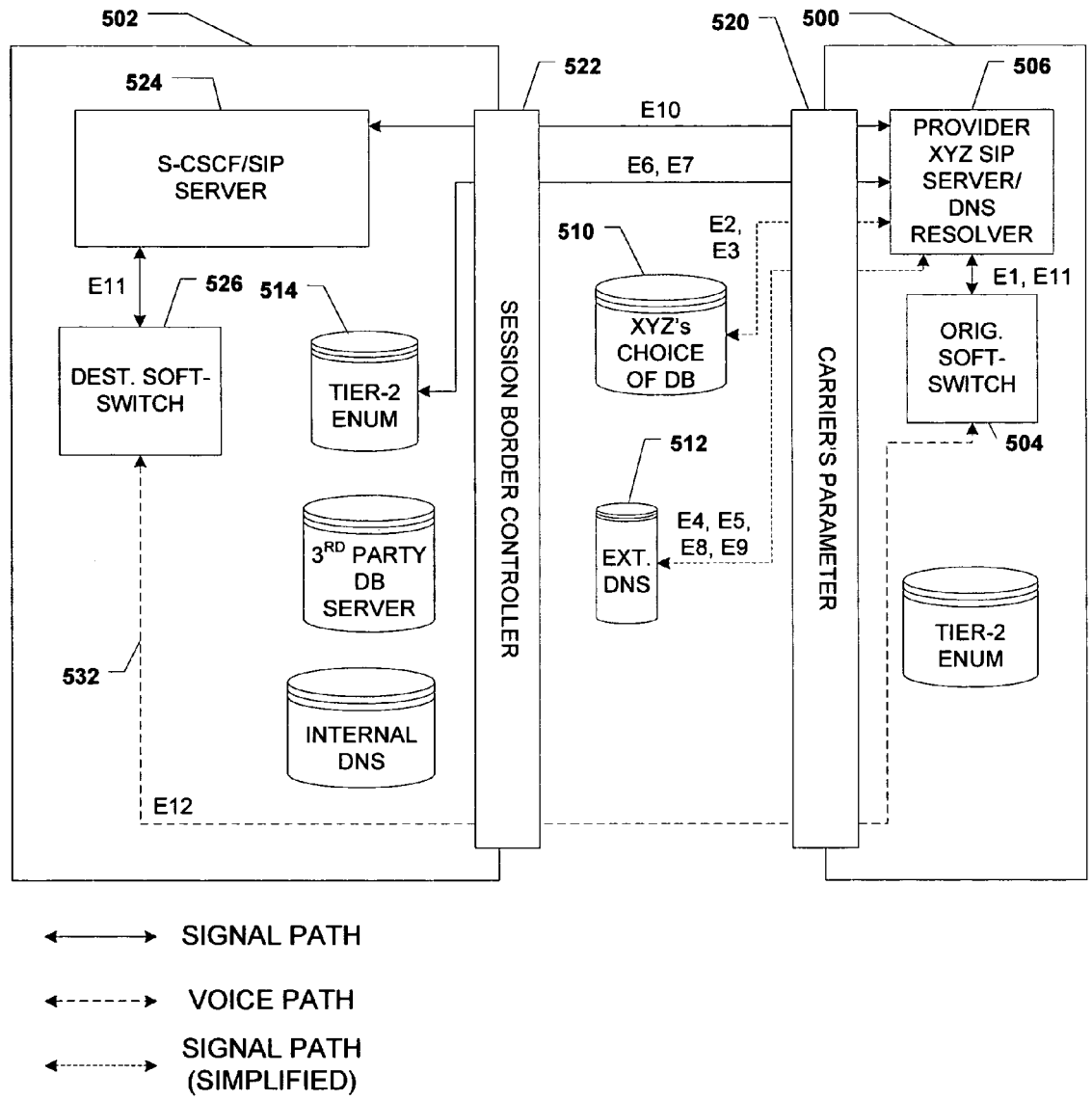
FIG. 5 is a block diagram of a fifth embodiment of a method and system to process a VoIP call to a destination telephone number.

FIG. 5 is a block diagram of a fifth embodiment of a method and system to process a VoIP call to a destination telephone number, such as an E.164 number. In this embodiment, the VoIP call is from a caller served by a first service provider to a callee served by a second service provider other than the first service provider. The first service provider has a network 500, and the second service provider has a network 502.

An originating softswitch 504 sends a SIP INVITE message to a first SIP server 506 of the first service provider (act E1). Based on the SIP INVITE message, the first SIP server 506 is responsible for finding an IP address of a destination SIP address. The SIP server 506 queries one or more databases/applications 510 of its choice based on the destination telephone number (act E2). In response to the query, the databases/applications 510 identify and return a domain name of a Tier-2 ENUM server 514 to the SIP server 506 (act E3). The SIP server 506 queries an external DNS server 512 to resolve the domain name of the Tier-2 ENUM server 514 (act E4). The external DNS server 512 is external to the network 500. In response to the query, the external DNS server 512 returns the IP address of the Tier-2 ENUM server 514 to the SIP server 506 (act E5).

Using the IP address, the first service provider queries the Tier-2 ENUM server 514 of the second service provider via an interface 520 of the network 500 and a Session Border Controller 522 of the network 502 (act E6). In response to the query, the first service provider receives a URI associated with the destination telephone number (act E7).

The first service provider queries the external DNS server 512 to resolve the domain name of the URI (act E8). In this embodiment, the first service provider receives an IP address of a domain of a second SIP server 524 of the second service provider (act E9).

The first SIP server 506 negotiates with the second SIP server 524 (act E10) to attempt to set up a bearer path for the VoIP call between the originating softswitch 504 and a destination softswitch 526 (act E11). If successful, a voice path 532 is established between the originating softswitch 504 and the destination softswitch 526 based on the URI (act E12).

Figure 6:
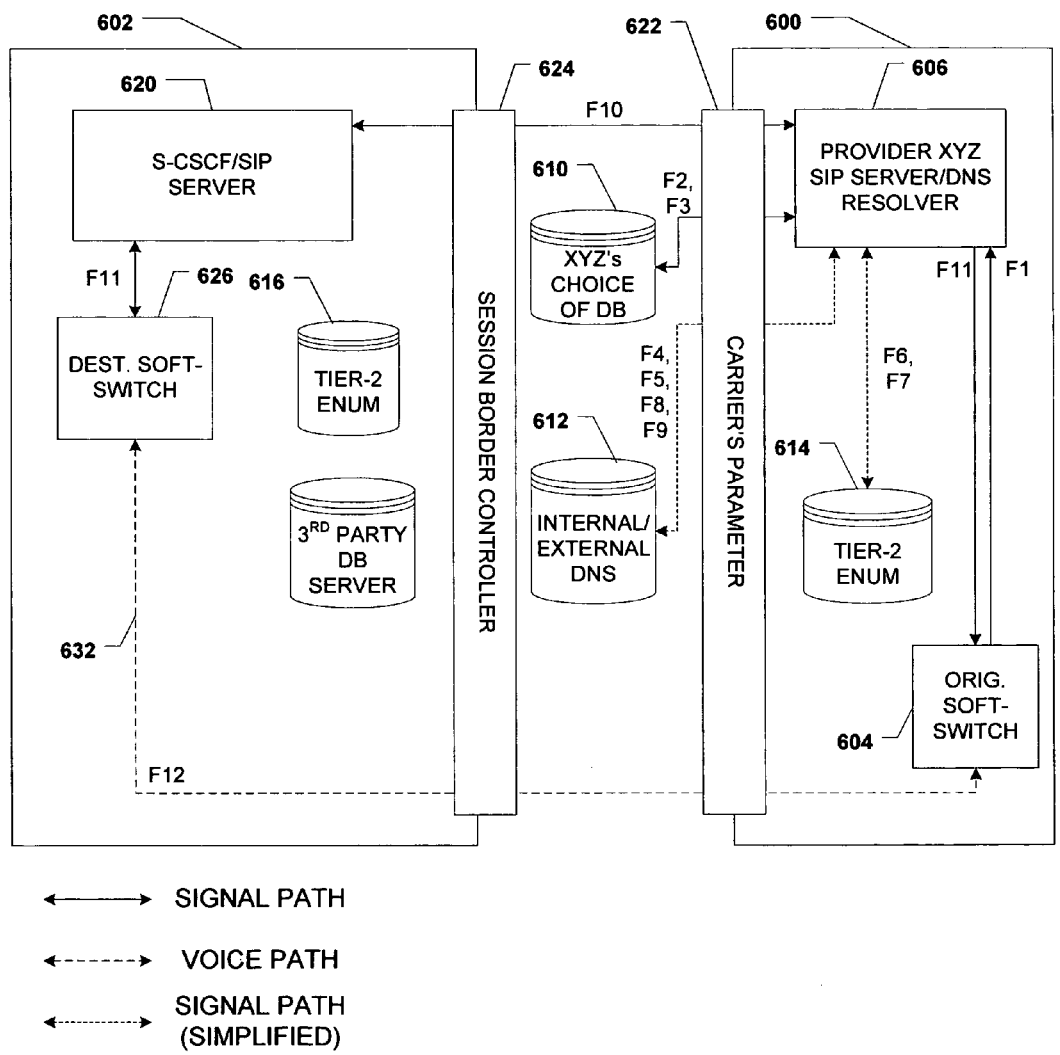
FIG. 6 is a block diagram of a sixth embodiment of a method and system to process a VoIP call to a destination telephone number.

FIG. 6 is a block diagram of a sixth embodiment of a method and system to process a VoIP call to a destination telephone number, such as an E.164 number. In this embodiment, the VoIP call is from a caller served by a first service provider to a callee served by a second service provider other than the first service provider. The first service provider has a network 600, and the second service provider has a network 602.

An originating softswitch 604 sends a SIP INVITE message to a first SIP server 606 of the first service provider (act F1). Based on the SIP INVITE message, the first SIP server 606 is responsible for finding an IP address of a destination SIP address. The SIP server 606 queries one or more databases/applications 610 of its choice based on the destination telephone number (act F2). In response to the query, the databases/applications 610 identify and return a domain name of a Tier-2 ENUM server 614 to the SIP server 606 (act F3). The SIP server 606 queries a DNS server 612 to resolve the domain name of the Tier-2 ENUM server 614 (act F4). In response to the query, the DNS server 612 returns the IP address of the Tier-2 ENUM server 614 to the SIP server 606 (act F5).

The first service provider queries the Tier-2 ENUM server 614 (act F6), and in response thereto, receives a URI associated with the destination telephone number (act F7). The first service provider queries the DNS server 612 to resolve the domain name of the URI (act F8). In this embodiment, the first service provider receives an IP address of a domain of a second SIP server 620 of the second service provider (act F9).

The first SIP server 606 negotiates with the second SIP server 620 (act F10) to attempt to set up a bearer path for the VoIP call between the originating softswitch 604 and a destination softswitch 626 (act F11). The first and second SIP servers 606 and 620 communicate via an interface 622 of the network 600 and a Session Border Controller 624 of the network 602. If successful, a voice path 632 is established between the originating softswitch 604 and the destination softswitch 626 based on the URI (act F12).

Figure 7:
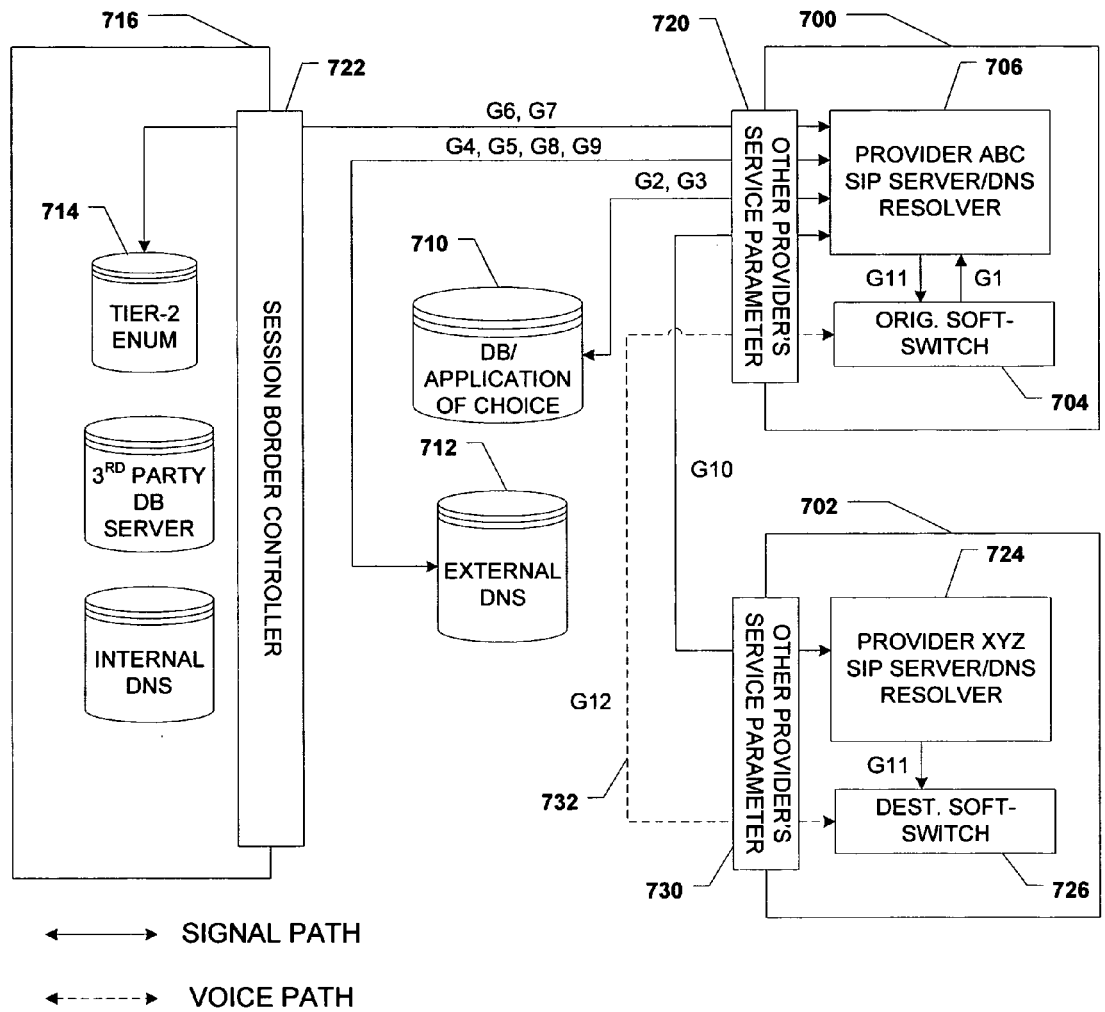
FIG. 7 is a block diagram of a seventh embodiment of a method and system to process a VoIP call to a destination telephone number.

FIG. 7 is a block diagram of a seventh embodiment of a method and system to process a VoIP call to a destination telephone number, such as an E.164 number. In this embodiment, the VoIP call is from a caller served by a first service provider to a callee served by a second service provider other than the first service provider. The first service provider has a network 700, and the second service provider has a network 702.

An originating softswitch 704 sends a SIP INVITE message to a first SIP server 706 of the first service provider (act G1). Based on the SIP INVITE message, the first SIP server 706 is responsible for finding an IP address of a destination SIP address. The SIP server 706 queries one or more databases/applications 710 of its choice based on the destination telephone number (act G2). In this embodiment, the authoritative Tier-2 ENUM server is a Tier-2 ENUM server 714 in a network 716 of a third service provider. The third service provider is a different provider than the first service provider and the second service provider. Thus, the Tier-2 ENUM server 714 is external to both the network 700 of the first service provider and the network 702 of the second service provider.

In response to the query, the databases/applications 710 identify and return a domain name of the Tier-2 ENUM server 714 to the SIP server 706 (act G3). The SIP server 706 queries an external DNS server 712 to resolve the domain name of the Tier-2 ENUM server 714 (act G4). In response to the query, the external DNS server 712 returns the IP address of the Tier-2 ENUM server 714 to the SIP server 706 (act G5).

The first service provider queries the Tier-2 ENUM server 714 (act G6), and in response thereto, receives a URI associated with the destination telephone number (act G7). The first service provider queries the Tier-2 ENUM server 714 via an interface 720 of the network 700 and a Session Border Controller 722 of the network 716 (act G8). The first service provider queries the DNS server 712 to resolve the domain name of the URI. In this embodiment, the first service provider receives an IP address of a domain of a second SIP server 724 of the second service provider (act G9).

The first SIP server 706 negotiates with the second SIP server 724 (act G10) to attempt to set up a bearer path for the VoIP call between the originating softswitch 704 and a destination softswitch 726 (act G11). The first and second SIP servers 706 and 726 communicate via the interface 720 of the network 700 and an interface 730 of the network 702. If successful, a voice path 732 is established between the originating softswitch 704 and the destination softswitch 726 based on the URI (act G12).

In any of the above-described embodiments, the third-party database may contain the E.164 numbers for which a service provider is authoritative, and may contain E.164 numbers for which the service provider is not authoritative. A query to the third-party database is for the purpose of identifying the owner of a telephone number such as an E.164 number.

Figure 8:
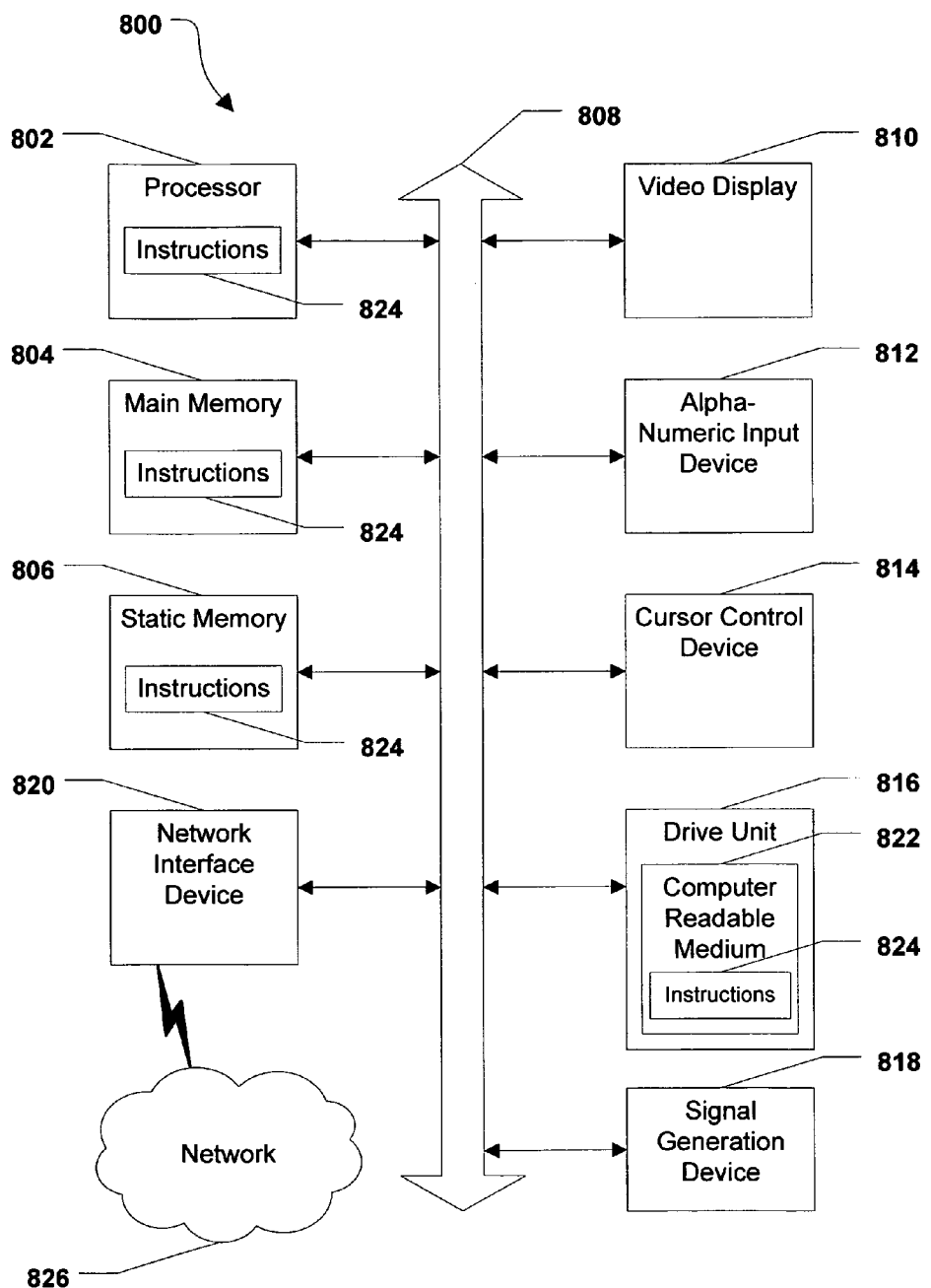
FIG. 8 is a block diagram of an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing a Voice over Internet Protocol (VoIP) call from a first service provider to a destination telephone number, the destination telephone number served by a second service provider other than the first service provider, the method comprising:

sending a Session Initiation Protocol (SIP) INVITE message from an originating switch to a first SIP server of the first service provider;

determining an Internet Protocol (IP) address of a telephone number mapping (ENUM) server of the second service provider based on a carrier identification of the destination telephone number in order to receive a Uniform Resource Identifier (URI) from the ENUM server of the second service provider at the first SIP server, wherein the ENUM server of the second service provider is identified based on the carrier identifier and wherein the second ENUM server is configured to map the destination telephone number to the URI and to return the URI;

querying, by the first SIP server, the ENUM server of the second service provider, and receiving the URI associated with the destination telephone number in response thereto;

querying, by the first service provider, a Domain Name Service (DNS) server based on the URI, and receiving an Internet Protocol (IP) address of a second SIP server of the second service provider in response thereto; and using the first SIP server and the second SIP server to set up a bearer path for the VoIP call between the originating switch and a destination switch.

2. The method of claim 1 wherein the ENUM server comprises a Tier-2 ENUM server.

3. The method of claim 1 wherein the DNS server is an internal DNS server of the first service provider.

4. The method of claim 1, further comprising:

querying a database server and receiving a carrier identifier of an owner of the destination telephone number in response thereto; and determining an address of the ENUM server of the second service provider based on the carrier identifier.

5. A method of processing a Voice over Internet Protocol (VoIP) call from a first service provider to a destination telephone number, the destination telephone number served by a second service provider other than the first service provider, the method comprising:

sending a Session Initiation Protocol (SIP) INVITE message from an originating switch to a first SIP server of the first service provider;

determining, by the first service provider, an Internet Protocol (IP) address of a telephone number mapping (ENUM) server of the second service provider based on a carrier identifier of the destination telephone number in order to receive a Uniform Resource Identifier (URI) from the ENUM server of the second service provider at the first service provider, wherein the ENUM server of the second service provider is identified based on the carrier identifier and wherein the ENUM server of the second service provider is configured to map the destination telephone number to the URI and to return the URI;

querying, by the first service provider, the ENUM server of the second service provider, and receiving the URI associated with the destination telephone number in response thereto;

querying, by the first service provider, a Domain Name Service (DNS) server based on the URI, and receiving an Internet Protocol (IP) address of a second SIP server of the second service provider in response thereto; and using the first SIP server and the second SIP server to set up a bearer path for the VoIP call between the originating switch and a destination switch.

6. The method of claim 5 wherein the ENUM server comprises a Tier-2 ENUM server.

7. The method of claim 5 wherein the DNS server is an internal DNS server of the first service provider.

8. The method of claim 5, further comprising:

querying a database server and receiving a carrier identifier of an owner of the destination telephone number in response thereto; and determining an address of the ENUM server of the second service provider based on the carrier identifier.

9. A method of processing a Voice over Internet Protocol (VoIP) call from a first service provider to a destination telephone number, the destination telephone number served by a second service provider other than the first service provider, the method comprising:

sending a Session Initiation Protocol (SIP) INVITE message from an originating switch to a first SIP server of the first service provider;

querying, by the first SIP server, a first telephone number mapping (ENUM) server of the first service provider to attempt to resolve the destination telephone number;

querying, by the first ENUM server, a database server and receiving a carrier identifier of an owner of the destination telephone number in response thereto;

determining an address of a second ENUM server of the second service provider based on the carrier identifier such that the address based on the carrier identifier is used to receive a Uniform Resource Identifier (URI) from the second ENUM server at the first service provider, wherein the second ENUM server of the second service provider is identified based on the carrier identifier and is wherein the second ENUM server is configured to map the destination telephone number to the URI and to return the URI;

querying, by the first service provider, the second ENUM server of the second service provider, and receiving the URI associated with the destination telephone number in response thereto;

querying, by the first service provider, a Domain Name Service (DNS) server based on the URI, and receiving an Internet Protocol (IP) address of a second SIP server of the second service provider in response thereto; and using the first SIP server and the second SIP server to set up a bearer path for the VoIP call between the originating switch and a destination switch.

10. The method of claim 9 wherein the first ENUM server comprises a first Tier-2 ENUM server, and wherein the second ENUM server comprises a second Tier-2 ENUM server.

11. The method of claim 9 wherein the DNS server is an internal DNS server of the first service provider.

12. The method of claim 11 further comprising:
receiving, by the internal DNS server, the IP address of the second SIP server from an external DNS server, the external DNS server external to the first service provider.

13. A method of processing a Voice over Internet Protocol (VoIP) call from a first service provider to a destination telephone number, the destination telephone number served by a second service provider other than the first service provider, the method comprising:
sending a Session Initiation Protocol (SIP) INVITE message from an originating switch to a first SIP server of the first service provider;
determining, by the first service provider, an address of a telephone number mapping (ENUM) server of a third service provider other than the first service provider and the second service provider;
querying, by the first service provider, the ENUM server of the third service provider, and receiving a Uniform Resource Identifier (URI) associated with the destination telephone number in response thereto;
querying, by the first service provider, a Domain Name Service (DNS) server based on the URI, and receiving an Internet Protocol (IP) address of a second SIP server of the second service provider in response thereto; and
using the first SIP server and the second SIP server to set up a bearer path for the VoIP call between the originating switch and a destination switch.

14. The method of claim 13 wherein the ENUM server comprises a Tier-2 ENUM server.

15. The method of claim 13 wherein the DNS server is an internal DNS server of the first service provider.

16. The method of claim 15 further comprising:
receiving, by the internal DNS server, the IP address of the second SIP server from an external DNS server, the external DNS server external to the first service provider.

17. A method comprising:
sending a Session Initiation Protocol (SIP) INVITE message from an originating switch to a SIP server;
querying, by the SIP server, a first telephone number mapping (ENUM) server to attempt to resolve a destination telephone number;
querying, by the first ENUM server, a database server and receiving a carrier identifier of an owner of the destination telephone number in response thereto;
determining a domain name associated with the carrier identifier and passing the domain name to the SIP server;
querying, by the SIP server, an internal Domain Name Service (DNS) server based on the domain name;
querying, by the internal DNS server, an external DNS server based on the domain name and receiving an Internet Protocol (IP) address of a second ENUM server in response thereto;
passing the IP address of the second ENUM server from the internal DNS server to the SIP server;
querying, by the SIP server, the second ENUM server and receiving a Uniform Resource Identifier (URI) associated with the destination telephone number in response thereto; and
using the SIP server to set up a bearer path between the originating switch and a destination switch based on the URI.

18. The method of claim 17 wherein the first ENUM server is internal to a Voice over Internal Protocol (VoIP) service provider, and wherein the second ENUM server is external to the VoIP service provider.

19. The method of claim 17 wherein the bearer path is set up for a Voice over Internet Protocol (VoIP) call to the destination telephone number.

20. The method of claim 17 wherein the first ENUM server comprises a first Tier-2 ENUM server, and wherein the second ENUM server comprises a second Tier-2 ENUM server.

21. A system for processing a Voice over Internet Protocol (VoIP) call from a first service provider to a destination telephone number, the destination telephone number served by a second service provider other than the first service provider, the system comprising:
a network of the first service provider, the network comprising an originating switch, a first Session Initiation Protocol (SIP) server, a first telephone number mapping (ENUM) server, and a database server, the network to:
send a SIP INVITE message from the originating switch to the first SIP server;
query, by the first SIP server, the first ENUM server to attempt to resolve the destination telephone number;
query, by the first ENUM server, the database server and receive a carrier identifier of an owner of the destination telephone number in response thereto;
determine an address of a second ENUM server of the second service provider based on the carrier identifier such that the address based on the carrier identifier is used to receive a Uniform Resource Identifier (URI) from the second ENUM server at the first service provider, wherein the second ENUM server of the second service provider is identified based on the carrier identifier and wherein the second ENUM server is configured to map the destination telephone number to the URI and to return the URI;
query the second ENUM server of the second service provider and receive the URI associated with the destination telephone number in response thereto;
query a Domain Name Service (DNS) server based on the URI and receive an Internet Protocol (IP) address of a second SIP server of the second service provider in response thereto; and
negotiate with the second SIP server to set up a bearer path for the VoIP call between the originating switch and a destination switch.

22. A computer-readable medium having computer-readable program code that causes a network comprising an originating switch, a Session Initiation Protocol (SIP) server, a first telephone number mapping (ENUM) server, a database server, and an internal Domain Name Service (DNS) server to perform acts of:
sending a SIP INVITE message from the originating switch to the SIP server;
querying, by the SIP server, the first telephone number mapping (ENUM) server to attempt to resolve a destination telephone number;
querying, by the first ENUM server, the database server and receiving a carrier identifier of an owner of the destination telephone number in response thereto;
determining a domain name associated with the carrier identifier and passing the domain name to the SIP server;
querying, by the SIP server, the internal DNS server based on the domain name;
querying, by the internal DNS server, an external DNS server based on the domain name and receiving an Internet Protocol (IP) address of a second ENUM server in response thereto;

passing the IP address of the second ENUM server from the internal DNS server to the SIP server;

querying, by the SIP server, the second ENUM server and receiving a Uniform Resource Identifier (URI) associated with the destination telephone number in response thereto; and using the SIP server to set up a bearer path between the originating switch and a destination switch based on the URI.

* * * * *